Nov. 25, 1958          H. GEHRE          2,861,453
VOLUME CORRECTION APPARATUS FOR GAS METERS
Filed Aug. 19, 1952
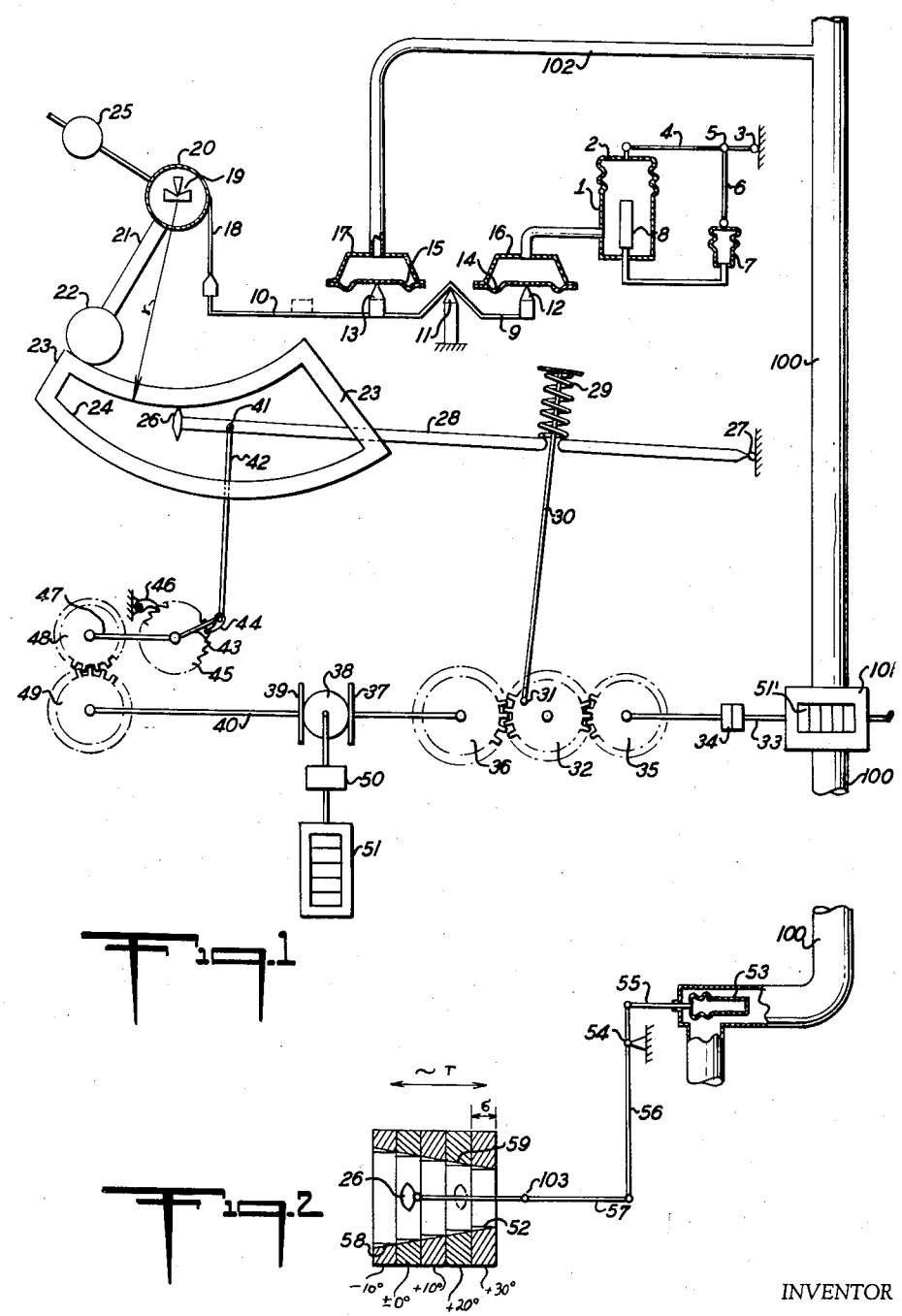
INVENTOR
HANS GEHRE
BY Burgess, Dinklage
ATTORNEYS United States Patent Office 2,861,453
Patented Nov. 25, 1958

2,861,453

VOLUME CORRECTION APPARATUS FOR GAS METERS

Hans Gehre, Oberkassel, Siegkreis, Germany

Application August 19, 1952, Serial No. 305,152

Claims priority, application Germany September 8, 1951

8 Claims. (Cl. 73—233)

The present invention relates to volume reduction or correcting devices for use with a meter for measuring gases flowing in pipe lines, that is, to devices for referring gas volumes measured at any existing state to selected or normal conditions.

In the usual volume reduction or correction devices, an elastic membrane box of thin-walled corrugated tube with comparison-gas inclosed therein is exposed to the gas to be measured, whereby the comparison gas assumes the pressure and temperature of the gas to be measured and its volume-change as a movement of the membrane bottom controls a variable ratio friction-drive or a summation-mechanism provided in the drive-transmission to the counting mechanism of the meter.

The known volume reduction or correction devices, to a great extent, lose their reliability after only a relatively short working time. Due to the inherent elasticity of the corrugated membrane box, which must be taken into consideration in calibrating the device and which box is subjected to the above-mentioned volume changes, causing considerable straining of the material, and which gives rise to progressive alteration thereof, until permanent distortion of the box makes its replacement essential. Further, the danger always exists with these devices that, due to a suddenly occurring excess pressure or loss of pressure in the pipe line, the membrane box may be so damaged as to become useless.

The above-mentioned deficiencies apply in a similar manner to a proposed volume correction device, in which the elastic membrane-box controls a regulator, such as a pressure regulator or through a relay an electrically operated heater located in the measuring-duct and serving as a temperature regulator, whereby the quotient $p/T$ of the absolute pressure and the absolute temperature is maintained contant and a variable ratio friction-drive or any other correction device in the drive-transmission to the counting mechanism of the meter is unnecessary.

A volume reduction device has already been proposed in which the comparison gas is enclosed in a lobe-like envelope which is submerged in a chamber filled with liquid, whereby the whole, the liquid container and the envelope of comparison-gas, is exposed to the gas to be measured and the height of the liquid meniscus gives a value for the actual size of the comparison gas volume.

In this known method, the temperature-equalisation between the comparison gas and the gas to be measured takes place extremely slowly because of the intervening liquid, the indication-correction is retarded for some time and a false measurement results. Moreover, because of the temperature difference between the liquid in the transfer-duct and the gas to be measured, the size of the comparison-gas volume is not correctly indicated.

The present invention enables a volume reduction or correction device to be constructed which is free from the above mentioned deficiencies and errors, and in which a comparison gas is no longer necessary for representing the temperature of the gas to be measured. According to the invention, a volume reduction or correction device for use with a meter in the measurement of gases flowing in pipe lines is provided, which includes a mechanical computing device which introduces the correction factor $z$ according to the gas equation of state from the measured quantities to control a variable intermediate drive, the device being characterized in that it comprises a pressure sum or difference computor coupled with an inclination balance, which serves as transmission means for transmitting the sum of the service gauge pressure $p_u$ of the gas being measured and the barometric reading $ba$ or the difference between the service gauge pressure $p_u$ and an auxiliary pressure $p_u^*$ in functional relationship with the barometric reading to the inclination balance, and the inclination balance serves as a quantity convertor and carries on its pendulum at least one control member, preferably a plate with a curve-shaped rimmed aperture for the engagement of a touching member periodically actuated by the meter and wherein the limiting curves of the aperture are empirically determined, so that the distance between the upper and lower aperture limits measured by the touching member in each position of the control member in a certain temperature range represenst a measure for the product of the quantities $(p_u+ba)/p_0$ or $(p_u-p_u^*/p_0)$, respectively, wherein $p_0$ represents the normal pressure, and a function of the chosen temperature range.

The invention and the principal considerations on which it is based are more fully explained in the following. It is known that the correction of volumes from the service state $p$, $T$ of the gas to be measured to the measurement standard $p_0$, $T_0$ takes place according to the equation of state:

$$\frac{p \cdot V}{T} = \frac{p_0 \cdot V_0}{T_0}$$

and hence $$V_0 = V \cdot \frac{p \cdot T_0}{p_0 \cdot T}$$

or, if one puts the quotient $$\frac{p \cdot T_0}{p_0 \cdot T} = z$$

$$V_0 = V \cdot z$$

where $z$ is the reduction or correction factor.

If the absolute pressure $p = ba + p_u$ and the absolute temperature $T = T_0 + \vartheta$ are now inserted, where $ba$ is the barometric pressure, $p_u$ is the service gauge pressure and $\vartheta$ is the service temperature of the gas to be measured, there is obtained:

(I) $$z = \frac{p}{T} \cdot \frac{T_0}{p_0} = \frac{(ba + p_u) \cdot T_0}{T \cdot p_0}$$

(II) $$= \left(\frac{ba}{p_0} + \frac{pu}{p_0}\right) \cdot (1 - R)$$

wherein $$R = \frac{T - T_0}{T} = \frac{\vartheta}{T}$$

This shows the way in which the correction factor $z$ is determined by the barometric pressure and the service gauge pressure on the one hand and by the value $R$ on the other hand, which value according to the above represents a function of the temperature $\vartheta$ of the gas to be measured. From this it also follows, therefore, that a satisfactory volume reduction is obtained, if the correction device in the counting mechanism drive (whether it is a known variable ratio or whether it is a known summing mechanism) is controlled in the way according to the invention in accordance with a correction factor $z$ represented on the basis of this equation.

Since spring-loaded adjusting means (membrane boxes, pistons and so on) are not allowable for measuring devices subject to the obligatory gauging, means as are otherwise used for pressure measurements, in carrying out the method according to the invention, the pressure values are preferably measured by weighing out, that is, by means of a balance and the displacement of which is communicated to the above mentioned convertor for the measuring values. This convertor is likewise an object of the invention as a means for carrying out the method according to the invention.

Now, complications arise in the measurement of the barometric pressure insofar as it has been measurable till now in no other way than with the known means of the membrane box or the mercury barometer, and the mercury barometer on its part does not come into consideration because of the maintenance of the Torricellian vacuum. This difficulty is overcome in the method according to the invention in that in place of the barometric state $ba$ an auxiliary value functionally dependent thereon is introduced. This is, for example, the difference between a fixed pressure (preferably 760 mms. mercury) and the existing barometric pressure $ba$, as is given from the following considerations:

For a gas enclosed in a vessel with variable volume at the state $V^*$, $T^*$, $p^*$, there is valid according to the general equation of state:

$$\frac{p_1^* \cdot V_1^*}{T_1^*} = \frac{p_0 \cdot V_0}{T_0} \text{ or } \frac{p_1^*}{p_0} = \frac{V_0 \cdot T_1^*}{T_0 \cdot V_1^*}$$

If care is taken that the quotient $$\frac{T_1^*}{V_1^*}$$

of the enclosed gas remains constant $$\frac{T_1^*}{V_1^*} = \frac{T_0}{V_0}$$

can be substituted. Therefore, $$\frac{p_1^*}{p_0} = \frac{V_0 \cdot T_0}{T_0 \cdot V_0} = 1$$

or, if the absolute pressure is written again as the sum of the barometric pressure and the gauge pressure:

$$\frac{p_1^*}{p_0} = \frac{ba + p_u^*}{p_0} = 1$$

where $p_u^*$ indicates the gauge pressure of the enclosed gas. Accordingly, $ba + p_u^* = p_0$ or $ba = p_0 - p_u^*$, from which it follows that the auxiliary pressure $p_u^*$ is an exact measure for the barometric pressure.

In other words, in order to gain an auxiliary pressure $p_u^*$, which is functionally dependent on the barometric state, it is only necessary to enclose for example any existing gas that will suit in a vessel with a movable wall and to adjust or control such wall so that the relationship $T_1^*/V_1^*$ or, quite generally, $T^*/V^*$ remains constant, and therefore, so that, if the temperature of the enclosed gas becomes changed by a certain percentage in one or other sense, its volume also alters similarly by the same percentage amount.

From $ba = p_0 - p_u^*$, it follows that $$\frac{ba}{p_0} = 1 - \frac{p_u^*}{p_0}$$

If this relationship is inserted in Equation II, there is given:

(III) $z =$ $$\left(1 + \frac{p_u - p_u^*}{p_0}\right) \cdot (1 - R) = 1 + \left(\frac{p_u - p_u^*}{p_0}\right) \cdot (1 - R) - R$$

It is emphasized that in the temperature function $$R\left(= \frac{T - T_0}{T} = \frac{\vartheta}{T}\right)$$

this refers to a function of the gas to be measured, which is not to be confused with the above-mentioned temperature $T_1^*$, of the enclosed auxiliary gas. Its value is given for the temperature $\vartheta = -10°$, $\pm 0°$, $+10°$, $+20°$, $+30°$ and $+40°$ of the gas to be measured as $R = -0.038$, $\pm 0°$, $+0.0353$, $+0.0625$, $+0.099$ and $+0.128$. A definite $R$-value is thus associated with each service temperature of the gas to be measured.

To represent the difference of two pressures, here the value $p_u - p_u^*$, any pressure difference indicator can serve, e. g. an inclination balance whose balance pans are formed as membranes. The pressure $p_u$ acts on one balance pan and the auxiliary pressure $p_u^*$ on the other. Then the displacement of the balance pointer or a control member connected thereto (control member or the like), insofar as the membranes have the same size, is proportional to the difference $p_u - p_u^*$. By this pressure difference representation, the use of spring-loaded adjustment means unallowable for measuring devices subject to the obligatory gauging is avoided. Thus on the mechanical side, namely by coupling the two pressures over the balance arm, the strict fulfilment of the above mathematical requirements is ensured.

In Fig. 1 of the drawing, a device for carrying out the method according to the invention is shown diagrammatically, with reference to the preferred case in which the auxiliary pressure $p_u^*$ referred to, dependent on the barometric pressure, is used as a control value.

Fig. 2 represents a view perpendicular to the plane of Fig. 1 which is taken through the balance rotation point 19 and the touching tip 26 and cuts all the control members.

In a vessel 1 with a movable wall 2 any gas that will suit is enclosed. A lever 4 pivotally mounted at 3 is linked to the wall 2 so that any position of such wall 2 is associated with a definite pivoted position of the lever 4. A rod 6 engages this at the link point 5, which rod 6 is controlled from the setting member 7 of a thermometer, whose temperature feeler 8 is arranged for example, in the vessel 1 and which assumes the temperature $T_1^*$ of the enclosed gas. By this the setting member 7 adjusts the height of the wall 2 through the lever 4 and hence the volume of the vessel 1 corresponding to the existing temperature $T_1^*$ of the enclosed gas.

The thermometer 7, 8 is preferably a fluid thermometer (mercury, toluene and so on), since in this construction the shifting forces are very great and no influence by the barometric pressure, that is, by the atmospheric pressure, which acts on the wall 2, need be feared.

The two sides of a balance arm are indicated by 9 and 10, which arm is supported on a rigidly mounted knife-edge 11 and carries two further knife-edges, a knife-edge 12 on the side 9 and a knife-edge 13 on the side 10. On these knife-edges 12 and 13, equal sized flexible membranes 14 and 15 are mounted as balance pans, one closed by the cover 16 and the other by the cover 17. The side 10 of the balance arm is suspended at its free end from a steel band 18 which passes over the shaft or barrel 20 of an inclination balance mounted on knife-edges at 19 and is secured thereon as one of its arms. Its other arm is a pendulum arm 21 with a weight 22, carrying on its lower extension a control member 23 with a sickle-shaped aperture 24. A counter-weight 25 is arranged in order to balance the influence of the control member 23 on the pendulum displacement.

The arrangement 1–9, 12, 14, 16 described here, by which the barometric pressure is measured indirectly, namely as the difference between a steady pressure $p_0$ and the gauge pressure $p_u^*$ of the enclosed gas, is referred to hereinafter as a difference barometer and the arrangement 1–8 as the transmitter or giver thereto.

The tip 26 of a touching lever 28 pivotally mounted at 27 engages the control member-aperture 24, and is limited in movement at one side by the upper and at the other side by the lower border of the control member aperture 24.

This lever 28 is in connection through a spring member 29 with a shifting rod 30 which engages a crank-pin 31 of a gear wheel 32, which is driven for its part by the shaft 33 of the meter (not shown) through the clutch 34 and a gear wheel 35. The gear wheel 32 is further engaged by a gear wheel 36, with which the sun-wheel 37 of a differential drive 37, 38, 39 is rigidly coupled. The other sun wheel 39 is rigid with a shaft 40 which is driven from the touching lever 28 through a butt shaft 42 linked thereto at 41, a latch lever 43, 44, a ratchet-wheel arrangement 45, 46, a shaft 47 and a pair of gear-wheels 48, 49. The pivotal movement of the planet wheel 38 is transmitted through an adjusting mechanism 50 to the counting mechanism 51.

The gauge pressure $p_u^*$ existing in the vessel 1 is transmitted to the membrane 14 through the cover 16 and the force acting on this membrane 14 is taken up by the knife-edge 12. The service gauge pressure $p_u$ of the gas to be measured acts correspondingly on the membrane 15 through the cover 17 and the force produced there is taken up by the knife-edge 13. Since the membranes 14 and 15 are the same size and are arranged at the same distance from the knife-edge 11, the force acting on the free end of the lever arm 10 is proportional to the difference $p_u - p_u^*$. It is taken up by the band 18 and imparts a moment of rotation to the shaft 20 and moves the pendulum 21, 22, through a corresponding displacement.

In the practical embodiment, the length of the lever arm 10 and diameter of the shaft or barrel 20 are preferably chosen so that the movements of membranes 14 and 15 are very small.

By the drive on the part of the meter shaft 33, the wheel 32 is set in rotation and the touching lever 28 is made to undergo an up-and-down pivoting movement about its pivot point 27, the amplitude of which is greater or smaller in accordance with the adjustment of the control member 23. This pivoting movement is converted by the above-described transfer members 40 to 49 into a rotary movement of the sun-wheel 39, which is thus turned, at each up-and-down movement of the lever 28, that is at each one rotation of the gear 32, by an amount corresponding to the existing position of the control member 23.

The upper border of the control member-aperture 24 represents a circular arc described about the bearing axis 19 of the shaft or barrel 20. The lower border of the control member aperture 24 may be constucted empirically so that the displacement of the sun-wheel 39 in any one rotation of the meter-shaft 33 equals $(p_u - p_u^*)/p_0$. The transmission from the wheel 32 to the sun-wheel 37 is determined by calculation so that the rotating movement of the sun-wheel 37 at each rotation of the wheel 32 equals 1 (see Equation III). Since both sun-wheels rotate in the same sense, the planet wheel 38 transmits the sum of the movements of the sun-wheels 37 and 39 to the counting mechanism 51 through the adjustment mechanism 50, which mechanism 51 now indicates the value $1 + (p_u - p_u^*)/p_0$.

According to Equation III, the volume reductor indicates correctly for $R=0$, hence for $\vartheta=0°$, then for this case $(1-R)=1$. For other temperatures, e. g. for $-10°$, $+10°$, $+20°$, $+30°$, $+40°$, other R-values come out and hence other $(1-R)$-values. Another transmission ratio corresponding to the value $(1-R)$ between the wheels 48 and 39 need not be inserted correspondingly for each temperature, but according to the invention, a corresponding number of control members are used, the lower aperture borders of which are so chosen and determined empirically, that the rotating movement of the sun wheel 39 at the respective temperature, or temperature range $\vartheta$ at each rotation of the meter-shaft 33, is equal to $$\frac{p_u - p_u^*}{p_0} \cdot (1-R)$$

These control members are placed together and interconnected as a structural unit, wherein the arrangement can be disposed so that their upper-aperture borders cover each other or also so that they do not cover each other. In the shown embodiment it is assumed that they do over each other. A thermometer 53 for measuring the service gas temperature is provided, preferably a liquid thermometer, which additionally controls the lever 28 in a plane perpendicular to its up-and-down movement, so that a touching contact takes place within that control member which is coordinated to the actual temperature of the gas being measured.

Fig. 2 of the drawing, which shows an arrangement of this kind, represents a view perpendicular to the plane of Fig. 1, taken through the balance rotation point 19 and the touching tip 26 and cuts all the control members. These control members, each of which is associated with one of the temperature ranges: $\vartheta = -10°, 0°, +10°, +20°, +30°$, all have the same thickness $\sigma$. The lower borders of their apertures 24 form stepped stages 52. In the shown phase the touching tip 26 is located in the $0°$—control member. With another temperature it would be located in another, e. g. with $20°$, as indicated by dotted lines, in the second control member from the right. A pivot lever drive 55, 56, 57, mounted at 54, serves for transmitting this perpendicular control of the lever 28.

If the stepped stages 52 are ground down, a profile 58 is given uniform ascending through the whole control member group and can now be correctly set for all intermediate temperatures without limitation to the temperature stages mentioned.

Now in accordance with the above, the sun wheel 39 is rotated through an amount $(p_u - p_u^*) \cdot (1-R)$, which is associated with the existing service temperature $\vartheta$, that is, the volume reduction occurs with the factor $$z = 1 + \frac{p_u - p_u^*}{p_0} \cdot (1-R)$$

Since according to Equation III, however, $$z = 1 + \frac{p_u - p_u^*}{p_0} \cdot (1-R) - R$$

the influence of the value R must still be taken into account. This value of R has to be substracted.

This can take place in a simple way by altering the displacement of the touching tip 26 by an amount $\Delta$, which corresponds to a rotation movement of the sun wheel 38 by the value R. For $\vartheta=0°$, $\Delta=0$, for other temperatures the value R, and hence the amount $\Delta$, has another value.

This correction can be provided not only on the upper, but also on the lower border of the various control member apertures. In the embodiment of Fig. 2, it is provided for the upper border. Since R increases with rising service temperature $\vartheta$, there is produced a step formation which is descending since with temperatures above $0°$ the value $\Delta$ is negative. In Fig. 1, each of these steps would be represented by a circular arc concentric with the upper aperture border of the $0°$—control member, whose radius differs from the corresponding radius $r$ of the $0°$-control member by the amount $\Delta$ associated with the service temperature $\vartheta$. For the same reasons as the lower steps, these upper steps can also be ground, whereby a profile 59 uniformly descending through the whole control member group is produced.

By this means, the thermometer 53 provides a correct lateral setting of the touching tip 26, which is determined by the profiles 58 and 59, for all temperatures lying between the limits $-10°$ and $+30°$, for each displacement of the pendulum 21, 22 and the control member 23. Consequently, the movement of the sun wheel 39 within the chosen temperature limits and for all service gauge pressures between that which is associated with the null position and that which is associated with the maximum displacement of the pendulum is equal to $$\frac{p_u - p_u^*}{p_0} \cdot (1-R) - R$$

The method of volume reduction according to the invention makes it possible without further means to correct the volume indication of the gas to be measured with one and the same arrangement in very wide temperature and pressure limits. If a higher pressure range is to be dealt with, the membrane 15 for indicating the pressure is replaced, for example, by a pressure indicator or a spring member. If excessively high pressures come into question, the arrangement for producing and transferring the auxiliary pressure $p_u$ (difference barometer 1–9, 12, 14, 16) becomes unnecessary, since then the alterations of the barometric pressure in comparison with the service gauge pressure of the gas to be measured become sufficiently small to be ignored.

The carrying out of the conversion method according to the invention is not limited to the means described and illustrated in the drawing. Instead of the connection of the beam and inclination balances, any other pressure difference indicator can serve for representing the value $p_u - p_u^*$. Likewise, instead of the contact device described, any of the variable transfer drives usual in volume reductor construction could be used, which is controlled by the displacement of the pressure difference indicator.

The case can occur which corresponds to the barometric pressure $ba$ being greater than the normal pressure ($p_0 = 760$ mms.). In order to avoid in such cases the membrane 14 becoming lifted from the the knife-edge 12, in accordance with the invention, an additional loading of the membrane 14 is effected which is preferably provided by increasing the pressure in the vessel 1 to a suitable extent. This additional loading of the membrane 14 is compensated by a weight (indicated on the arm 10 by dotted lines).

From the expression $p = ba + p_u = p_0 - p_u^* + p_u$, it follows that the described combination of the difference barometer 1–9, 12, 14, 16, on the one hand and the pressure difference indicator 10, 11, 13, 15, 17 to 22 on the other hand represents at the same time a device for direct measurement of the absolute pressure.

Obviously, there are cases met with in practice in which no measurement is required, which is subject to the obligatory service pressure and auxiliary gauging and in which, therefore, in contrast to the above described cases, the use of a membrane box is allowed and hence the use of the barometric pressure itself as a control value is possible.

In such cases, the device for producing and transferring the auxiliary pressure $p_u^*$ (difference barometer) is dispensed with and the expression $$\frac{ba}{p_0} \cdot (1-R)$$

can be approximately represented by the same means (inclination balance, contact lever, control member and so on) as a rotation movement of the sun-wheel 37 as was described above for the expression $$\frac{p_u}{p_0} \cdot (1-R)$$

for example as a rotation movement of the sun-wheel 39. The control is then simply produced by a barometer box.

What I claim is:

1. A volume correction device for use with a meter having a drive shaft, and a counting mechanism drive for measuring the volume of gas flowing through a pipe line; comprising means substantially continually responsive to the service gauge pressure $p_u$ of the gas flowing through the pipe line, means substantially continually responsive to barometric pressure change, means defining a curved aperture, a reciprocating member for actuation by a meter drive shaft movable back and forth transversely across said aperture limited by the aperture edges, means connected to said reciprocating member for varying the driving ratio between the meter drive shaft and the counting mechanism drive in accordance with the amplitude of movement of said reciprocating member and means connecting said means defining said curved shape aperture to said first two mentioned means for varying the longitudinal position of said reciprocating member along said aperture in accordance with the service pressure and the barometric pressure, said curved shaped aperture being shaped so that the transverse distances thereacross are dimensioned for a given temperature range in accordance with the sum of the service gauge pressure and a function of the barometric pressure divided by the reference pressure $p_0$.

2. Volume correction device according to claim 1, in which said means connected to the reciprocating member for varying the driving ratio between the meter drive shaft and the counting mechanism drive includes a differential drive having a planet wheel and two sun wheels, said planet wheel being mounted for connection to the counting mechanism of a meter, one sun wheel being mounted for connection or rotation with the drive shaft of the meter, and means actuated by said reciprocating member for rotating the other sun wheel in proportion to the amplitude of reciprocation of said member.

3. Volume correction device according to claim 2, wherein said means for defining a curved aperture include a number of separate means positioned side by side each defining a curved shaped aperture having the transverse distances thereacross dimensioned for a specific temperature range and including temperature responsive means for actuation by the temperature of gas flowing through the pipe line and means actuated by said temperature responsive means for transversely varying the position of said reciprocating member in a plane substantially perpendicular to its plane of reciprocation with respect to said means defining said curved shaped apertures.

4. Volume correction device according to claim 1 in which said means substantially continuously responsive to changes in service gauge pressure of gas flowing through the pipe line and said means substantially continuously responsive to changes in the barometric pressure, comprises means defining a volume confined chamber, a pivotally mounted balance arm having two balance pans connected thereto, said balance pans being in free communication with the atmosphere on one side, one of said balance pans being in pressure communication with the gas flowing in the pipe line on its other side and the other said balance pan being in pressure communication with the gas in said volume confined chamber on its other side and including means for maintaining the gas in said volume confined chamber at a constant ratio of temperature to volume.

5. A volume correction device for use with a meter having a drive shaft, a counting mechanism, and a counting mechanism drive for measuring the volume of gas flowing through a pipe line, comprising means defining a volume confined chamber, means for varying the volume of said volume confined chamber in proportion to the temperature, thereby keeping the ratio of temperature to volume constant within said volume confined chamber, means defining a first chamber enclosed with a membrane in pressure communication with the interior of said volume confined chamber, a means defining a second chamber enclosed with a membrane in pressure communication with said pipe line, a balance having a pivotal balance arm with each said membrane connected as a balance pan on each side thereof, a pendulum, means connecting said balance to said pendulum for swinging actuation thereof, a control member defininig a curved shaped aperture connected at one end of said pendulum, a reciprocating member movable back and forth transversely across the aperture of said control member under driving actuation by the drive shaft of the meter, the amplitude of motion of said reciprocating member being limited by the edges of said aperture, said aperture being shaped so that the transverse distances thereacross are dimensioned for a given temperature range, in accordance with the sum of the service gauge pressure and a function of the barometric pressure divided by the reference pressure $p_0$, a differential drive having a planet wheel and two sun wheels, said planet wheel being mounted for connection to the counting mechanism drive of the meter, one of said wheels being mounted for connection for rotation with the drive shaft of the meter, and the other of said sun wheels being mounted for connection for rotational actuation by said reciprocating member.

6. Volume correction device according to claim 5, in which said control member is a multiple control member consisting of a plurality of interconnected single control members mounted side by side the aperture of each being dimensioned and shaped for a different temperature range, and which includes temperature responsive means for actuation by the temperature of the gas flowing through the pipe line, said temperature responsive means being mounted for connection through a pivot lever drive with said reciprocating member for moving said reciprocating member transversely with respect to said control members in a plane substantially perpendicular to its plane of reciprocation.

7. Volume correction device comprising means defining a volume defined chamber, means for varying the volume of said volume confined chamber in proportion to the temperature, thereby keeping the ratio of temperature to volume constant within said volume confined chamber, means defining a first chamber enclosed with a membrane in pressure communication with the interior of said volume confined chamber, a means defining a second chamber enclosed with a membrane in pressure communication with said pipe line, a balance having a pivotally mounted balance arm with each said membrane connected as a balance pan on each side thereof, a pendulum, means connecting said balance to said pendulum for swinging actuation thereof, a control member defining a curved shaped aperture connected at one end of said pendulum, a reciprocating member movable transversely back and forth within said control member, the amplitude of motion of said reciprocating member being limited by the edges of said aperture, said aperture being shaped so that the transverse distances thereacross are dimensioned for a given temperature range in accordance with the sum of the service gauge pressure and a function of the barometric pressure divided by the reference pressure $p_0$, a wheel mounted for connection with a meter drive shaft for rotation therewith, a shaft eccentrically mounted for connection at one end to said wheel and at the other end to said reciprocating member, a connecting rod, a latch lever, and a ratchet wheel, said latch lever being positioned for rotating said ratchet wheel, said connecting rod connecting said latch lever and said reciprocating member, a differential drive having a planet wheel and two sun wheels, said planet wheel being mounted for connection to a meter counting mechanism drive, one of said sun wheels being mounted for connection for rotation with the drive shaft of a meter, and at the other of said sun wheels being mounted for connection for rotation with said ratchet wheel.

8. Volume correction device according to claim 7, in which said control member is a multiple control member consisting of a plurality of interconnected single control members mounted side by side and which include the aperture of each being dimensioned and shaped for a different temperature range, temperature responsive means for actuation by the temperature of a gas flowing through the pipeline, said temperature responsive means being mounted for connection through a pivot lever drive with said reciprocating member for moving said reciprocating member transversely with respect to said control members in a plane substantially perpendicular to its plane of reciprocation.

References Cited in the file of this patent

UNITED STATES PATENTS

| 1,208,494 | Connet | Dec. 12, 1916 |
| 1,278,077 | Reeve | Sept. 3, 1918 |
| 1,621,203 | Houghton | Mar. 15, 1927 |
| 2,059,547 | Brandl | Nov. 3, 1936 |
| 2,348,593 | Beitler | May 9, 1944 |